United States Patent

[11] 3,586,002

| [72] | Inventor | Ernest C. Wood |
| | | Los Angeles, Calif. |
| [21] | Appl. No. | 696,466 |
| [22] | Filed | Jan. 8, 1968 |
| [45] | Patented | June 22, 1971 |
| [73] | Assignees | Peter B. Samuels |
| | | Encino, ; |
| | | Rene G. LeVaux |
| | | Los Angeles, Calif., part interest to each |

[54] SURGICAL SKIN CLIP
  10 Claims, 4 Drawing Figs.
[52] U.S. Cl............................................. 128/337, 128/346
[51] Int. Cl............................................. A61b 17/08
[50] Field of Search........................................ 128/325, 334, 337, 346; 24/30.5, 67

[56] References Cited
UNITED STATES PATENTS
| 733,723 | 7/1903 | Lukens............................ | 128/337 |
| 816,026 | 3/1906 | Meier............................. | 128/337 |
| 3,273,562 | 9/1966 | Brown............................. | 128/337 |

FOREIGN PATENTS
| 418,970 | 10/1910 | France........................... | 128/337 |
| 752,633 | 7/1933 | France........................... | 128/337 |

Primary Examiner—Dalton L. Truluck
Attorney—McDougall, Hersh & Scott

ABSTRACT: A skin clip in the form of a metal which retains the shape to which it is deformed comprising a pair of elongate arms in laterally spaced apart parallel relation with skin engaging members extending inwardly from the inner edges of each arm and a support connected to the arms and extending crosswise of the arms in a plane offset from the plane of the arms with said support having intermediate portions which limit the clip depth of the arms and a clip applicator having a pair of jaw members with grooves adapted to receive the supporting portions therebetween and means constantly urging the jaw members in a direction towards each other with a force sufficient to retain the clips therebetween when in open position and in which the clip arms may have a number of longitudinally spaced skin gripping members for lengthwise suturing of the skin.

PATENTED JUN22 1971  3,586,002

INVENTOR.
ERNEST C. WOOD

SURGICAL SKIN CLIP

This invention relates to clips for use in the joinder of separated sections of skin wherein such skin or derma clips replace the many stitches heretofore required for closing wounds, incisions and the like.

Derma clips for skin closure have previously been employed, as described in the Brown Pat. No. 3,273,562. Difficulties are often experienced with such devices because of the inability to gain full visual access to the portions of the skin to which clip is being applied with the result that mislocation often occurs. Sometimes variations occur in the depth of skin engaged by the clip with the result that irritations and swelling often occur and clip removal becomes painful. Still further, a large number of such clips are required for proper skin closure and the clips extend outwardly a substantial distance from the surface of the skin with the result that considerable time and effort is required for clip application and removal and the applied clips are difficult to bandage and are often bumped or otherwise snagged with resulting pain or discomfort.

It is an object of this invention to provide a new and improved derma clip which is easy to apply and easy to remove, which has an automatic depth regulating means that accurately controls the depth of the grip taken by the clip, which has a wide open mouth at the area of contact with the skin to enable full and clear observation of the application of the clip for more accurate location, which can effect closure along a number of points thereby to enable skin closure to be effected with a minimum number of applications, which embodies means for automatic adjustment of tension to relieve any swelling or other pressures which might develop in use, and which has a low silhouette thereby to provide an attractive closure which is capable of a neat bandage and which provides less chances for snagging or the like, and it is a related object to provide an applicator for use with same.

These and other objects and advantages of this invention will hereinafter appear and for purposes of illustration, but not of limitation, embodiments are shown in the accompanying drawing, in which.

Figure 1:
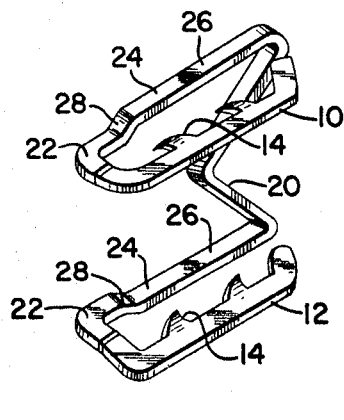
FIG. 1 is an enlarged perspective view of a from of derma clip embodying the features of this invention with the clip in open position.
Figure 2:
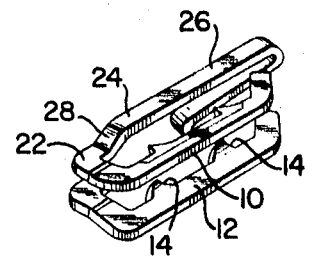
FIG. 2 is an enlarged perspective view of the clip shown in FIG. 1 with the clip in closed position.

The clip members of this invention are formed of aseptic medical materials which are deformable as distinguished from resilient or springlike in that they retain the form to which they are forcibly deformed form from to closed positions while being characterized by sufficient strength and rigidity to hold the shape to which they formed or deformed between open and closed position. Clips of the type described can be formed of sheet metal such as of stainless steel, treated or coated steels and the like materials which are resistant to corrosion or attack by the body fluids. They may also by formed of plastics, laminates and the like and they can be fabricated of bands, wires, strips or the like.

In the preferred practice of this invention, the clips are formed of a pair of substantially parallel arms 10 and 12 spaced one from another by an amount greater than the skin separation with spicules 14 extending inwardly and angularly from the inner edges of the spaced arms.

The number of spicules on each arm will depend somewhat upon the effective length of the arms. For example, with arms having a length of from three-sixteenths inch to one-half inch, as many as two to three spicules can be provided in longitudinally spaced apart relation on the edge of each arm. With still longer arms of up to 1 inch, as many as four to five spicules can be used, but it is usually undesirable to make use of a clip with arms having a length greater than three-fourths inch for skin closure.

The arms are connected one to the other in their spaced parallel relation by a support in the form of an M-shaped member 20 disposed in a plane substantially parallel with the plane of the arms but spaced upwardly therefrom by an amount adapted to correspond to the depth of the grip of the clip whereby the M-shaped support operates to abut the surface of the skin during application thereby to regulate the depth of the arms at the time that they e displaced from open to closed positions to grip the skin during closure.

Extensions 22 from the free ends 24 of the outer legs 26 of the M-shaped support turn downwardly to engage the adjacent free ends of the spaced arms 10 and 12 to secure the arms with the support. In the preferred practice, the extensions 22 are formed with an inward offset 28 to locate the arms a short distance inwardly of the support legs 26 and below the legs with the spaced relation between the arms and legs corresponding to the depth of grip.

Since the gripping action is by substantially parallel movement of the arms, uniform pressure is applied throughout the length of the arms for better distribution of force and more effective gripping action. Since the depth of grip is regulated by the support, and particularly the intermediate portion of the M-shaped member, the depth of grip is no longer subject to judgement by the surgeon but is reliably constant from one application to the other for optimum use and appearance. Because the arms have an effective length, two or more spicules can be used in longitudinally spaced apart relation to give the effect of a number of clips or stitches from but a single application.

By reason of the accordion type support remote from the gripping arms, less irritations arise with lesser amounts of swelling or inflammation. For the same reason, and because of the resiliency of the assembly, pressures generated at the skin level in response to swelling or irritation can be mitigated by a certain amount of give between the arm supports to relieve pressure.

The spread of the legs 20 will effect corresponding spread of the arms 10 and 12 so that it becomes a simple and easy matter for removal of the clip, as by means of a simple tool adapted to engage the parallel legs to spread the legs and free the arms from the skin and to enable the clip to be lifted by the support for removal. The arms can be spread as widely ad desired for freeing the clip and they may be closed as tightly as possible to effect skin closure. While the arms can be made to work effectively to grip the skin in between in response to mere closure, it is preferred to make use of spicules for positive engagement between the arms and the adjacent portions of the skin.

The offset in the leg portions 20 of the support provides for better support between the applicator jaws but such offset is not essential for use of the clip devices of this invention. Similarly, other configurations of elements for interconnecting the legs 20 of the support may be employed, such as a V-shaped portion, accordion portion, or the like folding members adapted to maintain the legs in parallel relation during displacement between open and closed positions.

Figure 4:
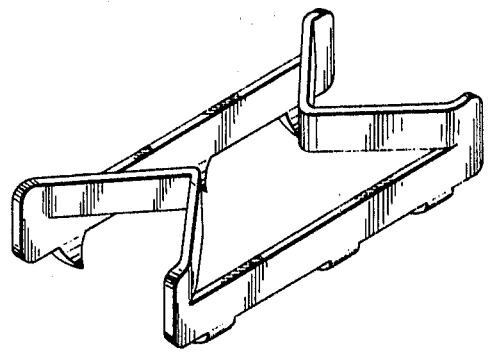
FIG. 4 is a perspective view of a still further modification of derma clip.

In the modification shown in FIG. 4, the support comprises oppositely facing V-shaped members with the opposite ends of the clip arms connected to the V-shaped members to provide an integral unit having spaced parallel arms and a foldable support which retains the arms in parallel relation during movement between open and closed positions.

Figure 3:
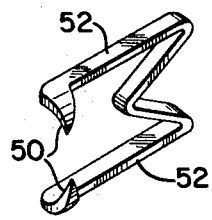
FIG. 3 is a perspective view of a modified derma clip embodying the features of this invention.

In the modification shown in FIG. 3, the arms and legs are joined as a single element with the spicules 50 extending inwardly from the edge of the arms 52. In this modification the arms are adapted to be received in the grooves 40 of the clamping jaws while the spicule end portion projects from the jaw members in position to engage portions of the skin in between. In will be apparent that this modification is not the equivalent of the preferred form illustrated in FIGS. 1—8 since it does not embody means for automatic control of the clip depth but it does have the advantage of parallel arms which move in parallel relation between open and closed positions.

The described applicator is not only simple in construction and efficient in operation but, unlike the applicator previously described, it can be used in a manner to provide for lengthwise application to position the clip lengthwise along the line of incision.

It will be understood that changes may be made in the details of construction and operation without departing from the spirit of the invention, especially as defined in the following claims.

I claim:

1. A clip for skin closure comprising a pair of elongate arms in spaced parallel relation when in open position, skin engaging members extending inwardly from an edge of each of the arms in the direction towards the other, and a collapsible support between the arms and interconnecting the arms and integral therewith with one end of the support joined to one of the arms and the other end of the support joined to the other arm with the support offset from the arms in the direction away from the skin engaging members which maintains the arms in substantially parallel relation when in open and collapsed positions and during movement between open and collapsed positions.

2. A skin clip as claimed in claim 1 in which the skin engaging members comprise one or more spicules extending inwardly from the edge of each of the arms.

3. A skin clip as claimed in claim 2 in which each arm has two or more spicules in longitudinally spaced apart relation.

4. A clip for skin closure comprising a pair of elongate arms in spaced parallel relation, skin engaging members extending inwardly from an edge of each of the arms in the direction towards the other, and a collapsible support for the arms which maintains the arms in substantially parallel relation during movement between open and collapsed positions and in which the support comprises a pair of laterally spaced apart parallel legs and means extending between the legs in substantially the same plane for interconnecting the legs one with the other.

5. A skin clip as claimed in claim 4 in which the support comprises an M-shaped member having laterally spaced apart parallel legs and a V-shaped portion in between interconnecting the legs for parallel movement.

6. A skin clip as claimed in claim 5 in which the arms are connected at one end to the adjacent end of the legs.

7. A skin clip as claimed in claim 6 in which the arms are in a plane parallel wit the plane of the support and spaced downwardly a short distance from the support.

8. A skin clip as claimed in claim 7 in which the arms are spaced inwardly from the supporting legs.

9. A clip for skin closure comprising a pair of elongate arms in spaced parallel relation, skin engaging members extending inwardly from an edge of each of the arms in the direction towards the other, and a collapsible support for the arms which maintains the arms in substantially parallel relation during movement between open and collapsed positions and in which the support comprises a pair of oppositely extending M-shaped members having common legs.

10. A skin clip as claimed in claim 1 in which the arms form a part of the support.